(12) United States Patent
Prince (10) Patent No.: US 10,752,465 B2
(45) Date of Patent: Aug. 25, 2020

(54) HOSE REEL BRAKE APPARATUS

(71) Applicant: CADMAN POWER EQUIPMENT LIMITED, Courtland (CA)

(72) Inventor: Kenneth Henry Prince, Wingham (CA)

(73) Assignee: CADMAN POWER EQUIPMENT LIMITED, Courtland, Ontario (CA)

( * ) Notice: Subject to any disclaimer, the term of this patent is extended or adjusted under 35 U.S.C. 154(b) by 0 days.

(21) Appl. No.: 15/795,464

(22) Filed: Oct. 27, 2017

(65) Prior Publication Data

US 2018/0118505 A1    May 3, 2018

Related U.S. Application Data

(60) Provisional application No. 62/417,080, filed on Nov. 3, 2016.

(51) Int. Cl.
| | |
|---|---|
| *B65H 75/44* | (2006.01) |
| *A01C 23/00* | (2006.01) |
| *B65H 75/30* | (2006.01) |
| *B65H 75/42* | (2006.01) |

(52) U.S. Cl.
CPC ....... *B65H 75/4407* (2013.01); *A01C 23/008* (2013.01); *B65H 75/30* (2013.01); *B65H 75/425* (2013.01); *B65H 75/4421* (2013.01); *B65H 75/4428* (2013.01); *B65H 75/4442* (2013.01); *B65H 75/4489* (2013.01); *B65H 2701/33* (2013.01)

(58) Field of Classification Search
CPC ............ B65H 75/4407; B65H 75/4489; B65H 75/4442; B65H 75/4428; B65H 75/425; B65H 75/4421; B65H 75/30; B65H 2701/33; A01C 23/008

See application file for complete search history.

(56) References Cited

U.S. PATENT DOCUMENTS

| | | | |
|---|---|---|---|
| 2,906,472 A | 9/1959 | Hannay et al. | |
| 2,954,190 A | 12/1960 | Le Clair | |
| 3,309,066 A * | 3/1967 | Carlson | B66D 1/22 242/390.9 |
| 3,563,481 A * | 2/1971 | Stahmer | B65H 75/38 242/390.6 |
| 4,228,939 A * | 10/1980 | Cattaneo | B21B 25/02 226/172 |
| 4,311,165 A | 1/1982 | Rose, Jr. | |
| 4,454,999 A * | 6/1984 | Woodruff | B65H 49/34 242/388.7 |
| 4,616,791 A * | 10/1986 | Harvey | A01G 25/095 242/390.1 |
| 4,756,486 A | 7/1988 | Campell | |
| 5,950,953 A * | 9/1999 | Baugh | B65H 75/4402 242/157.1 |
| 7,108,218 B2 | 9/2006 | Chapman et al. | |
| 8,720,811 B2 * | 5/2014 | Zink | B65H 75/38 242/397 |

(Continued)

*Primary Examiner* — William A. Rivera (57) ABSTRACT

A hose reel apparatus has a frame and a drum rotatably attached on the frame for receiving a hose wound thereon. A drive system and brake assembly are attached on the frame operatively engaged with the drum. An indexer is slidably mounted on a guide rail on the frame having a channel for receiving the hose and adjacent clamp arms which are selectively operable to clamp the hose.

7 Claims, 7 Drawing Sheets

(56) References Cited

U.S. PATENT DOCUMENTS 9,067,759 B2 6/2015 Tracey et al.
2008/0054118 A1* 3/2008 Czajkowski .......... B63B 35/815
242/395

* cited by examiner

HOSE REEL BRAKE APPARATUS

CROSS-REFERENCE TO RELATED APPLICATIONS

This application claims the benefit of U.S. provisional patent application No. 62/417,080 filed Nov. 3, 2016, the entirety of which is incorporated herein by reference.

FIELD OF THE INVENTION

The present invention relates to agricultural fertilizer application equipment, in particular, to a hose reel apparatus for liquid fertilizer application.

BACKGROUND

Agricultural application of liquid fertilizer often involves the use of plastic hard hose to carry the liquid fertilizer from a tank or pipe outlet adjacent the field to an applicator that travels back and forth across the field. In order to avoid dragging the hose, which is filled with liquid fertilizer, across the field as the applicator travels back and forth, the hose is mounted on a hose reel. The reel winds and unwinds the hose as the applicator travels across the field.

As the hose is being pulled off the reel, there is a tendency for the reel to keep rotating, due to the momentum of the hose and liquid fertilizer therein. This can cause over-rotation of the reel when the applicator stops or slows down. Over-rotation of the reel in turn leads to slack in the hose, which can interfere with the alignment of the coils of the hose as it is wound back onto the reel. This is particularly problematic on short pulls, where the applicator stops the pull out cycle (when the applicator is travelling away from the reel) and begins the retrieve cycle (when the applicator is travelling back towards the reel) before the hose is completely unwound from the reel.

SUMMARY OF THE INVENTION

A hose reel apparatus, according to the present invention, has a frame with a guide rail and a drum rotatably attached on the frame for receiving a hose wound in concentric helical rows thereon. The guide rail is spaced apart from the drum and extends across the width of the drum. A drive system is mounted on the frame and is operatively engaged with the drum to rotate the drum and thereby wind the hose. A brake assembly is attached on the frame and is operatively engaged with the drum. An indexer is slidably mounted on the guide rail, defines a channel for receiving the hose therethrough, and has adjacent clamp arms selectively operable to clamp the hose.

In another embodiment, the drum has a flange extending radially from the drum at one end and the drive system powers a drive gear which is operatively engaged with the flange by way of a drive belt.

In another embodiment, the motion of the indexer on the guide rail is controlled by a gear assembly operated by the flange that moves the indexer along the guide rail in response to the rotation of the drum.

In another embodiment, the indexer has one or more supporting rollers in the channel so as to define a closed central aperture.

In another embodiment, the adjacent clamp arms are pivotally mounted on the indexer to form a scissor clamp.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE PREFERRED EMBODIMENT

The hose reel apparatus, according to the present invention, is used with a pull vehicle, such as a tractor equipped with a liquid fertilizer applicator system, and has a brake and a clamp, which are selectively engaged to maintain tension on the hose during pullout and retrieval operations. The hose reel apparatus facilitates "short pulls", where the hose is not completely unwound, during the pullout operation, before being re-wound on the reel, during the retrieval operation. These "short pulls" are facilitated by preventing slack in the hose that would interfere with the alignment of the hose on the reel during re-winding.

As shown in FIGS. 1-4, the hose reel apparatus has a cylindrical drum 1 on which the hose 2 is wound in concentric helical rows. The hose reel apparatus is intended for use with plastic hard hose, with an outside diameter of about 6.750 inches and an inside diameter 5.5 inches. Alternatively, other types of semi-rigid hose may be used. On either end of the drum 1 are flanges 3, which extend radially from the drum 1 to prevent the hose 2 from moving past the ends of the drum 1.

Figure 1:
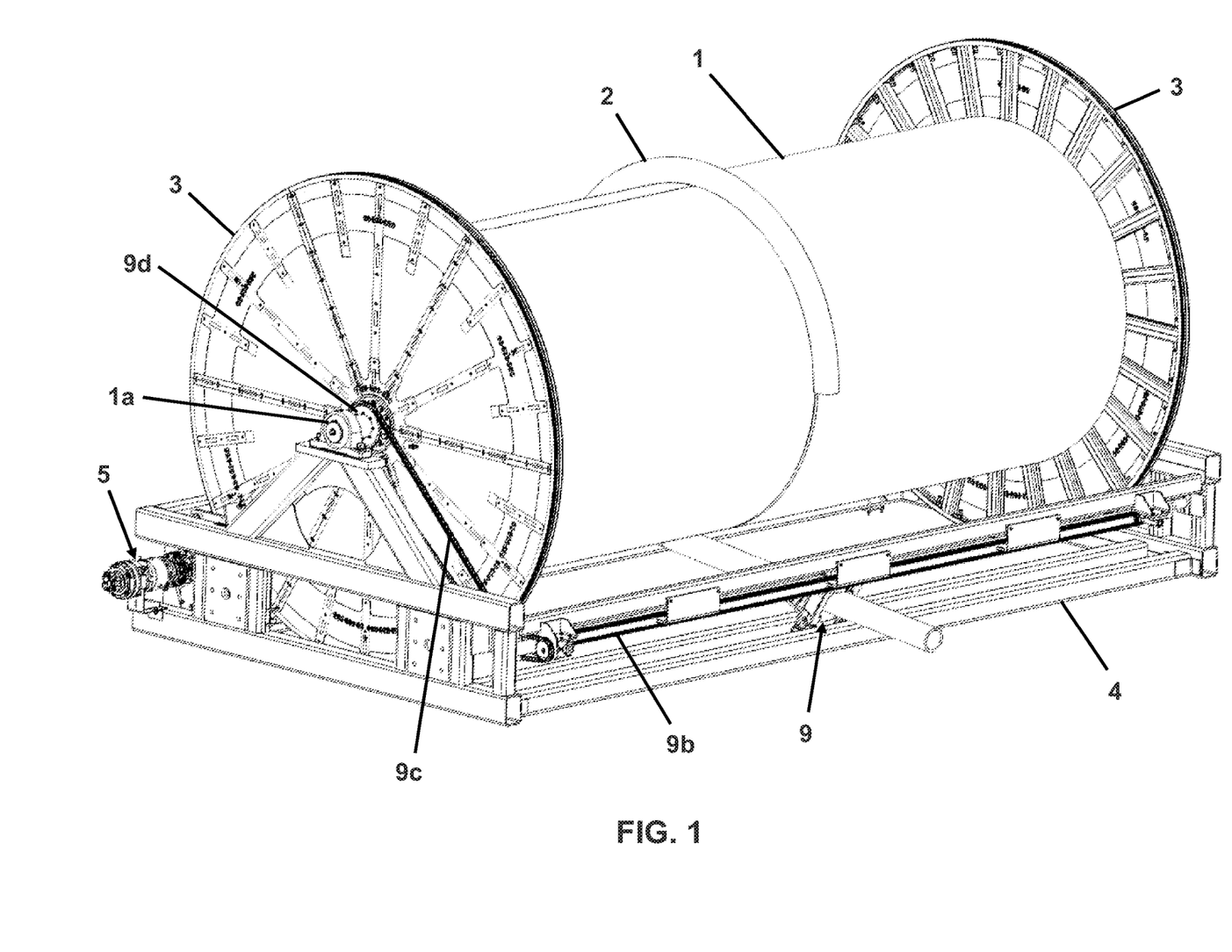
FIG. 1 is a perspective view of the hose reel apparatus, according to the present invention.
Figure 2:
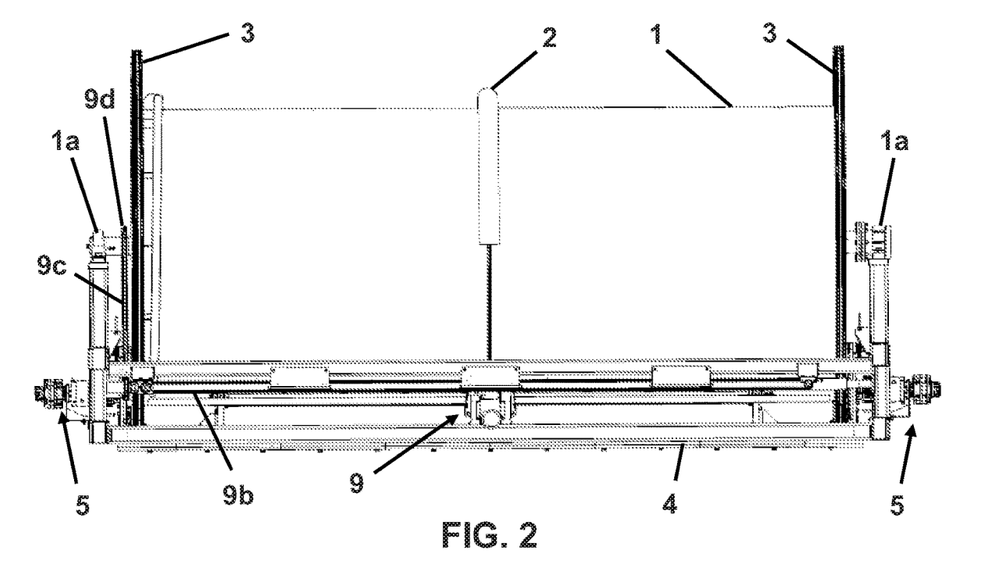
FIG. 2 is a front view of the hose reel apparatus.
Figure 3:
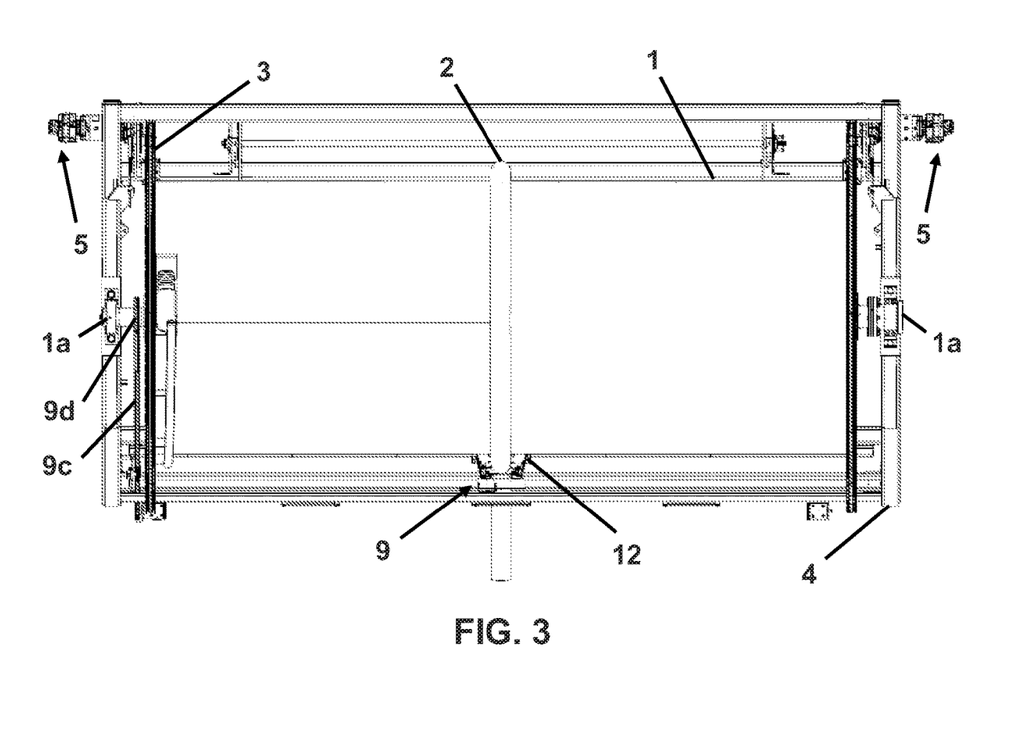
FIG. 3 is a top view of the hose reel apparatus.
Figure 4:
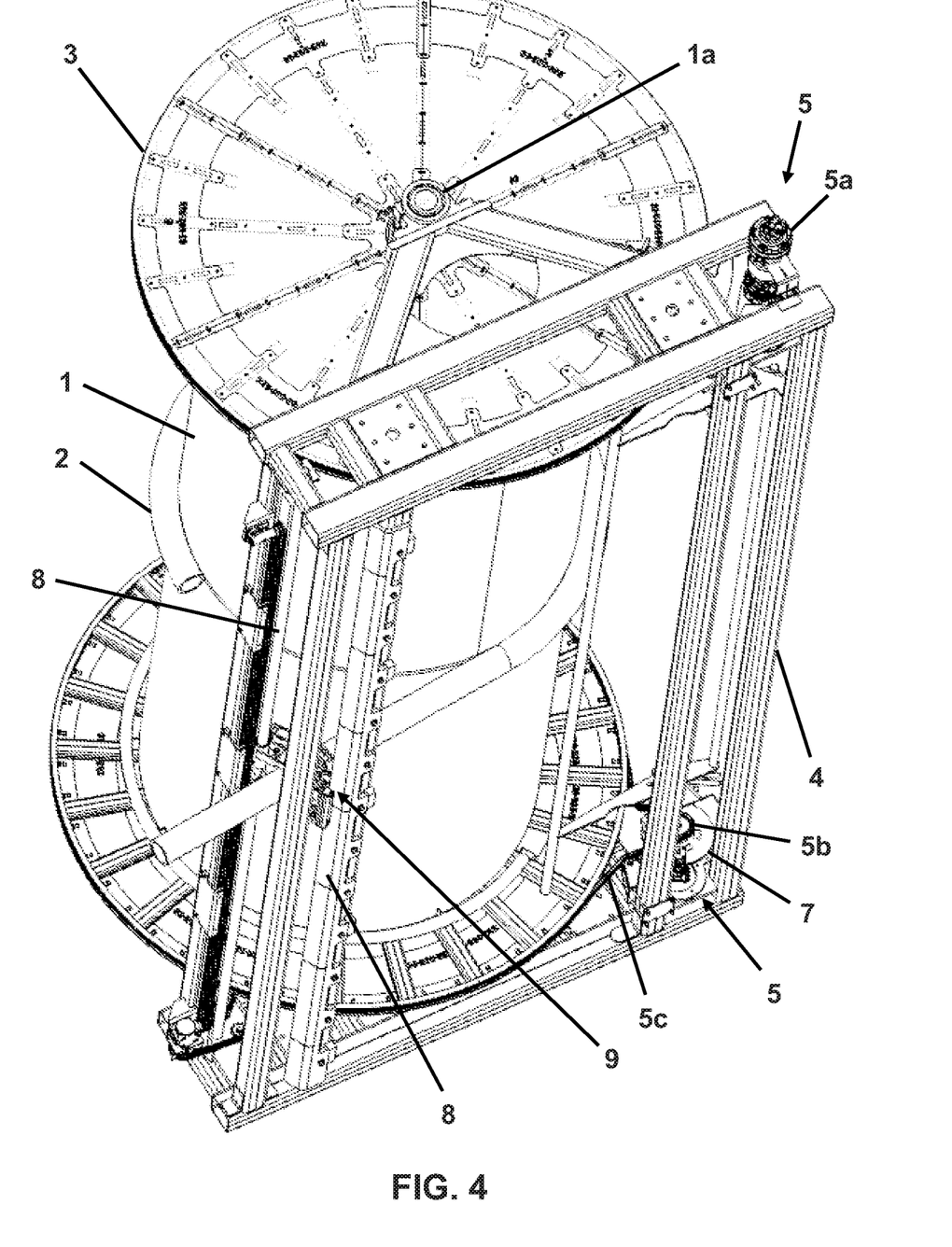
FIG. 4 is another perspective view of the hose reel apparatus, from below the frame.

The drum 1 is rotatably mounted on a frame 4, which supports the drum 1 and the hose 2 wound thereon. As shown in FIG. 1, the drum 1 is mounted on the frame 4, by way of rotary bearings 1a on either end of the drum 1. The frame 4 may be mounted on a vehicle, or may be provided with wheels (not shown), to permit the frame to move, or be pulled, along the side of a field as the pull vehicle travels away from and back to the hose reel apparatus while applying liquid fertilizer to the field.

Figure 5:
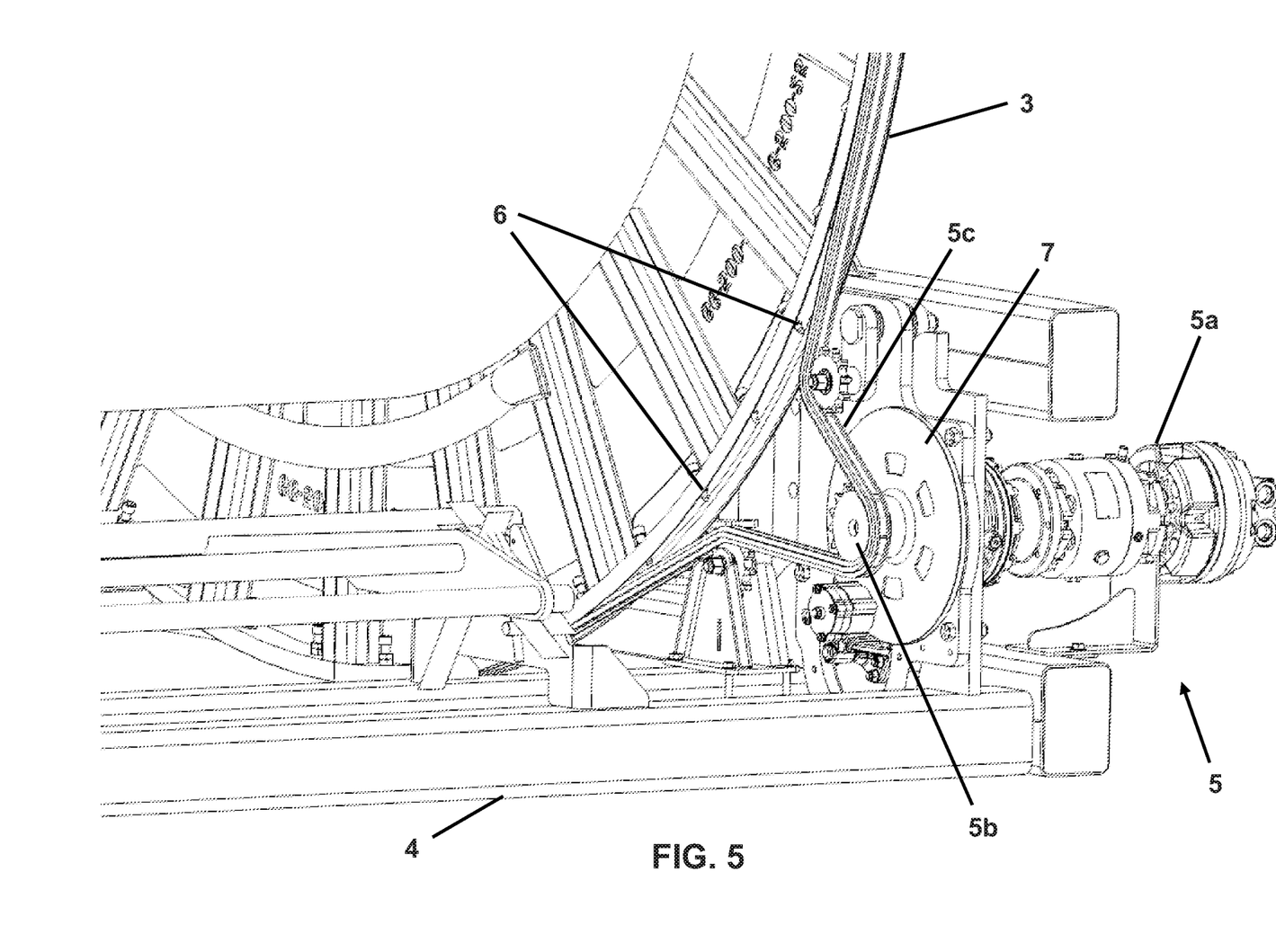
FIG. 5 is a detail view of the drive system of the hose reel apparatus, with a portion of the frame removed to provide an unobstructed view of the drive system.

A drive system 5 is mounted on the frame 4 and is operatively engaged with the drum 1 to drive the rotation of the drum 1. Preferably, a hydraulic motor is used to power the drive system 5, but other types of motors may be used. The hydraulic motor may be driven by pumps on the diesel engine of the vehicle to which the frame 4 is attached. As shown in FIG. 5, the motor 5a powers a drive gear 5b, which is engaged with a drive belt 5c, which in turn is engaged with the drum 1 to power the rotation of the drum 1. The drive belt 5c engages with teeth 6 on the circumference of the flange 3 on the end of the drum 1 adjacent the drive system 5 to transfer drive from the motor 5a to the drum 1.

A brake 7 is attached to the frame 4 and is operatively engaged with the drum 1 to slow or stop the rotation of the drum 1. As shown in FIG. 5, a disc brake is attached to the drive system 5 between the motor 5a and the drive gear 5b. The brake 7 may be applied during a pullout operation to stop the rotation of the drum 1 when the pull vehicle stops or changes speed or direction. The brake 7 thereby limits or prevents over-rotation of the drum 1 that would cause slack in the hose 2.

The frame 4 also supports two guide rails 8, which are parallel to and spaced apart from the drum 1 and extend across the width of the drum 1. Slidably mounted on the guide rails 8 is an indexer 9, which moves back and forth on the guide rails 8 to assist in properly aligning the hose 2 as it is unwound and re-wound on the drum 1. The motion of the indexer 9 on the guide rails 8 is controlled by a gear assembly operated by the flange 3. As shown in FIG. 1, the indexer 9 is driven by a gear assembly with belts 9b and 9c, which transfer drive from a gear 9d on one of the flanges 3 to the indexer 9. The speed at which the indexer 9 travels along the guide rails 8 is correlated to the speed at which the drum 1 is rotated, so as to align the indexer 9 with the axial position along the drum 1 at which the hose 2 is being unwound or re-wound.

Figure 6:
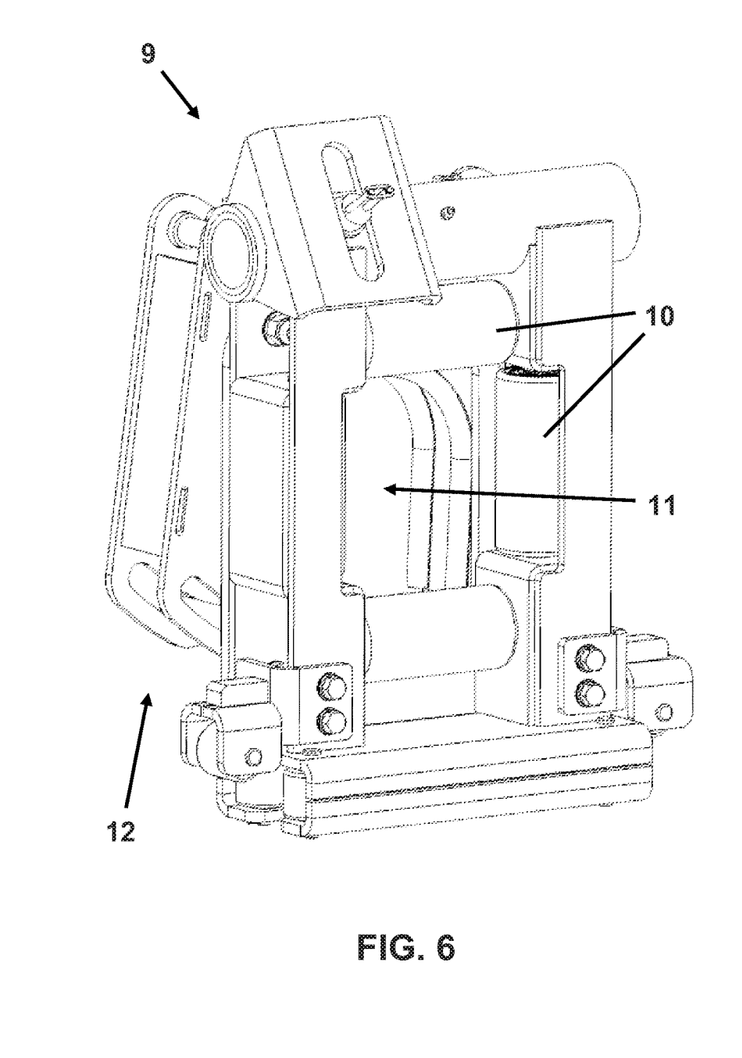
FIG. 6 is a perspective view of the indexer of the hose reel apparatus.
Figure 8:
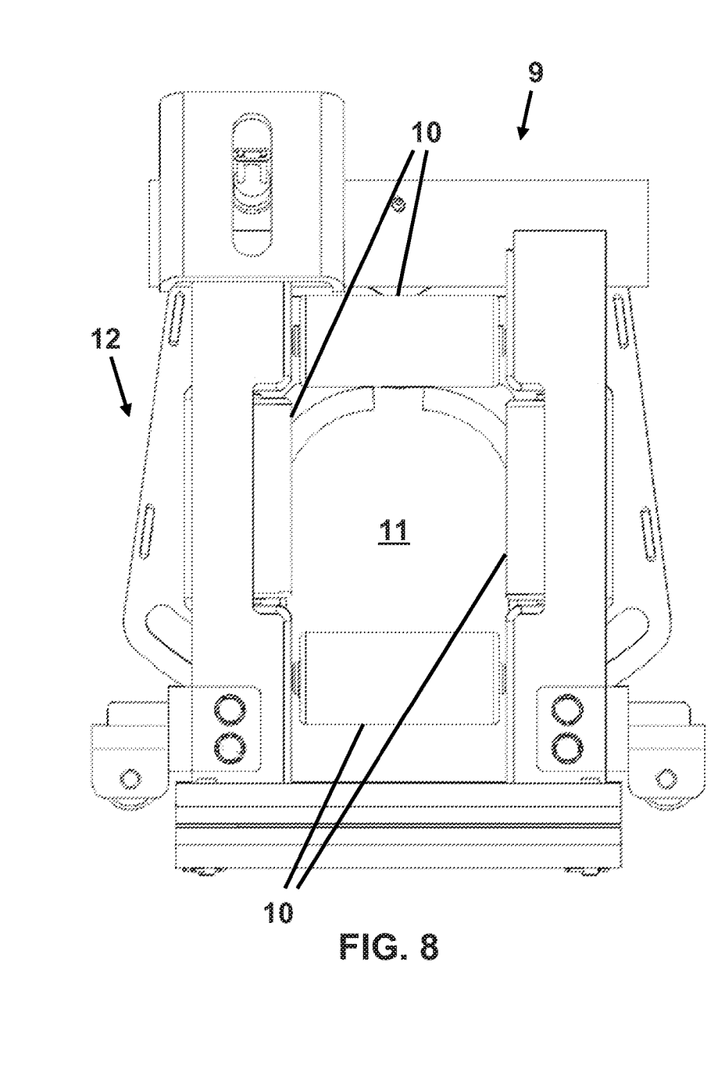
FIG. 8 is a front view of the indexer.

The indexer 9 defines a channel for receiving the hose 2 and through which the hose 2 passes. As shown in FIGS. 6 and 8, the indexer 9 has four supporting rollers 10 arranged about the channel, defining a central aperture 11 through which the hose 2 passes to reduce wear on the hose 2 as it passes through the indexer 9. Any number of rollers 10 may be used in or about the channel to support the hose 2.

Figure 7:
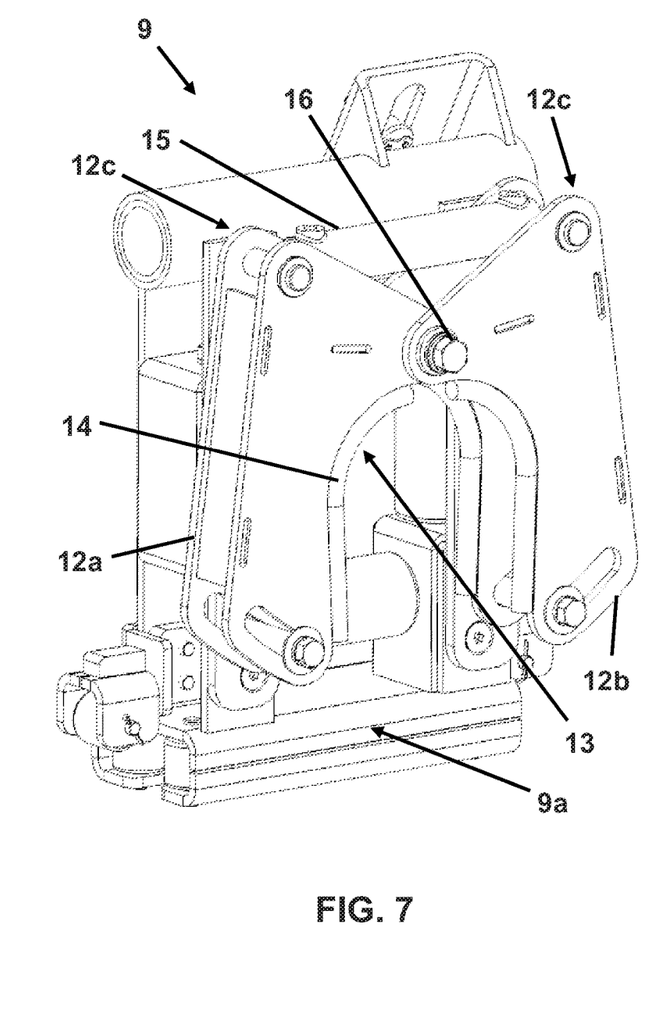
FIG. 7 is another perspective view of the indexer, from the rear.
Figure 9:
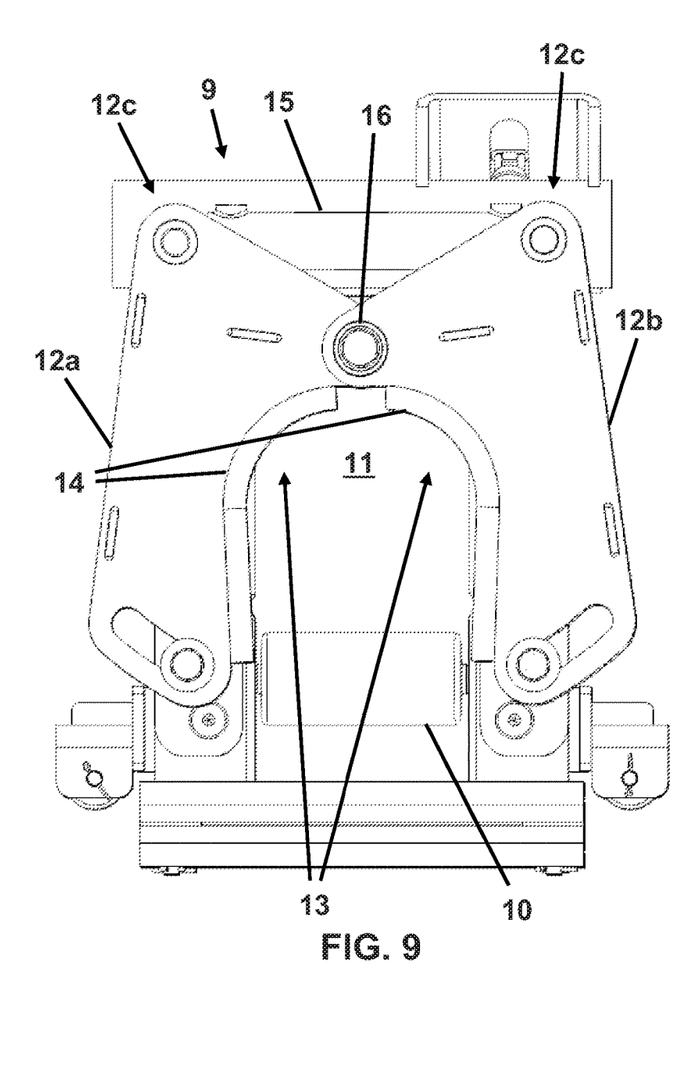
FIG. 9 is a rear view of the indexer.

The indexer 9 has a clamp 12 attached on the rear 9a of the indexer 9, which faces the drum 1. As shown in FIGS. 7 and 9, the clamp 12 is a scissor clamp with two adjacent clamp arms 12a and 12b, shaped complimentary to the cross-section of the hose 2. The clamp arms 12a and 12b are pivotally attached to the rear 9a indexer 9 adjacent the central aperture 11, so as to pivot between an un-clamped position and a clamped position. In the un-clamped position, the clamp arms 12a and 12b are spaced apart from one another so as to provide a space therebetween larger than the cross-section of the hose 2. In the clamped position, the clamp arms 12a and 12b pivot towards one another so as to abut against the hose 2 and apply pressure to the outside surface of the hose 2, thereby limiting movement of the hose 2 through the indexer 9.

As shown in FIGS. 7 and 9, the clamp arms 12a and 12b each have a rounded groove 13 formed thereon, facing the groove 13 on the opposing clamp arm 12a or 12b. A grip 14 may be fixed along the interior surface of each groove 13, to improve the clamping function of the clamp arms 12a and 12b. Preferably, the grips 14 are flexible rubber beads, but other types of grips 14 may be also be used. In some embodiments, the grips 14 may reduce wear on the hose 2, caused by the clamp 12.

Figure 10:
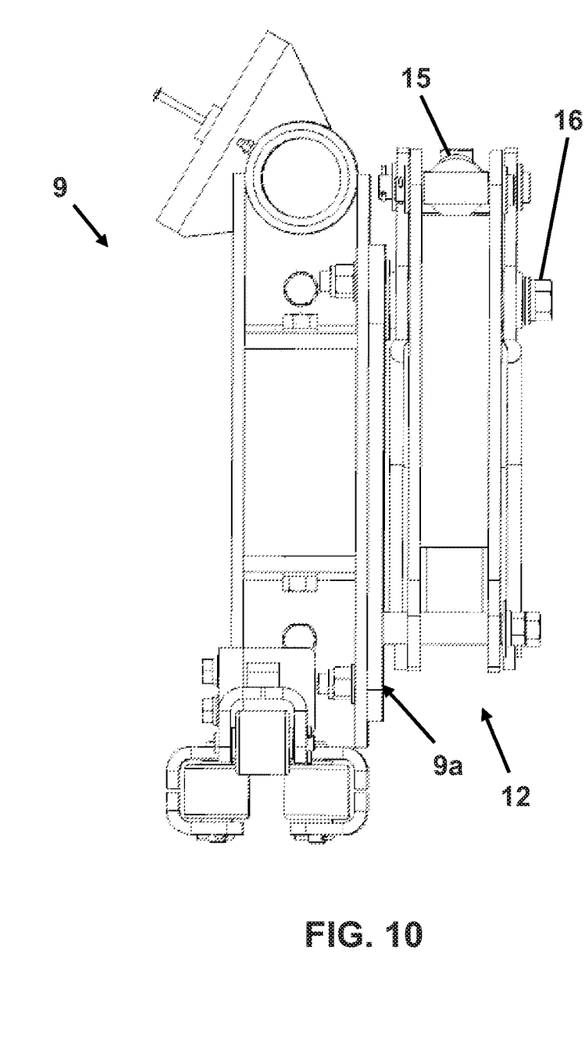
FIG. 10 is a side view of the indexer.
Figure 11:
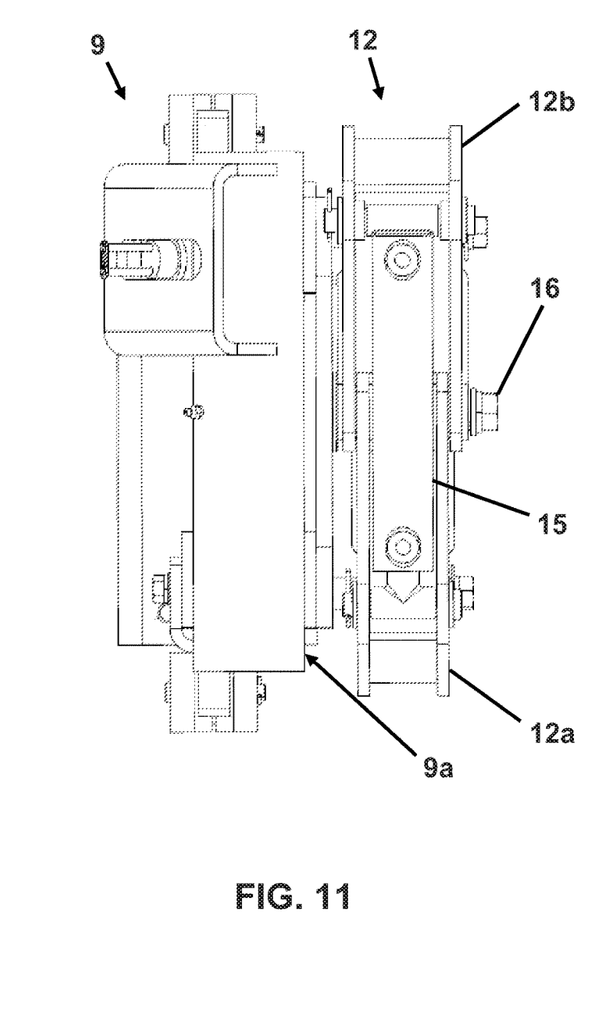
FIG. 11 is a top view of the indexer.

The pivoting action of the clamp arms 12a and 12b is powered by a piston 15 attached to the upper end 12c of each of the clamp arms 12a and 12b. As shown in FIGS. 7, 10, and 11, the clamp arms 12a and 12b are pivotally attached to the indexer 9 by way of a pivot pin 16, extending from the rear 9a of the indexer 9, located generally above the central aperture 11. The pivot pin 16 is inserted through the clamp arms 12a and 12b at a position spaced apart from their upper ends 12c. The piston 15 is pivotally attached to the clamp arms 12a and 12b at their upper ends 12c to thereby open and close the clamp 12 as the piston 15 is extended and retracted. Preferably, a hydraulic piston 15 is used, but other types of pistons may be used, such as a pneumatic piston.

A control device is used to operate the drive system 5, the brake 7, and the clamp 12 to control the unwinding and re-winding of the hose 2 on the drum 1 and prevent slack in the hose 2. Preferably, the control device is integrated into the control systems of the pull vehicle, but it may also be provided as a separate device, such as a tablet or other mobile electronic device that the operator may carry or mount inside the pull vehicle. Preferably, the device remotely communicates with the hose reel apparatus to send and receive signals, but a wired connection may also be used. The control device may run a software application to automate some or all of the functions of the hose reel apparatus. For example, an operator may select a pullout operation and thereafter, the control device will monitor the rotation of the drum and the speed of the pull vehicle, and operate the brake 7 and the clamp 12 accordingly to permit unwinding of the hose 2 while preventing over-rotation of the drum 1 and slack in the hose 2.

In operation, the hose reel apparatus is positioned adjacent a field and the free end of the hose 2 is attached to a pull vehicle, such as by attaching the hose 2 to the inlet pipe on a liquid fertilizer applicator pulled behind a tractor. The operator of the pull vehicle then begins a pullout operation and drives the pull vehicle away from the hose reel apparatus, unwinding the hose 2 as the pull vehicle moves along the field. During the pullout operation, the control device partially engages the brake 7 to prevent over-rotation of the drum 1, for example, as a result of changes in the speed of the pull vehicle. The brake 7 also resists the natural tendency of the hose 2 to unwind and return to its elongated configuration. The control device monitors the rotation of the drum 1 and fully engages the brake 7 and also engages the clamp 12, if the drum 1 stops rotating at any point during the pullout operation.

At the end of the pullout operation, when the pull vehicle has reached the opposite end of the field, before the retrieval operation, the control device fully engages the brake 7 and also engages the clamp 12. This prevents rotation of the drum 1 and any further unwinding of the hose 2, and also prevents any slack in the hose 2 from forming around the drum 1 as a result of the operator re-positioning the pull vehicle to begin the retrieval operation.

The operator then begins the retrieval operation, after re-positioning the pull vehicle, if necessary, and drives the pull vehicle back towards the hose reel apparatus. Once the retrieval operation begins, the control device disengages the brake 7 and the clamp 12, and engages the drive system 5 to re-wind the hose 2 on the drum 1 and maintain tension on the hose 2 as the pull vehicle drives back to the hose reel apparatus.

The forgoing description, together with the accompanying figures, have set out detail of the structure and function of the present invention, however, the disclosure is to be understood as illustrative of the preferred embodiments and changes may be made without departing from the scope of the invention, as described herein.

What is claimed is:
1. A hose reel apparatus, comprising:
a frame having a guide rail;
a drum rotatably attached on the frame for receiving a hose wound in concentric helical rows thereon, wherein the guide rail is spaced apart from the drum and extends across the width of the drum;

a drive system mounted on the frame and operatively engaged with the drum to rotate the drum and thereby wind the hose;

a brake assembly attached on the frame and operatively engaged with the drum;

an indexer slidably mounted on the guide rail, the indexer defining a channel for receiving the hose therethrough and having adjacent clamp arms selectively operable to clamp the hose and thereby limit axial movement of the hose through the indexer.

2. The hose reel apparatus of claim 1, wherein the drum has a flange extending radially from the drum at one end, and wherein the drive system powers a drive gear which is operatively engaged with the flange of the drum by way of a drive belt.

3. The hose reel apparatus of claim 2, wherein the drive system is a hydraulic motor.

4. The hose reel apparatus of claim 2, wherein the motion of the indexer on the guide rail is controlled by a gear assembly operated by the flange that moves the indexer along the guide rail in response to the rotation of the drum.

5. The hose reel apparatus of claim 1, wherein the indexer has one or more supporting rollers in the channel, so as to define a closed central aperture.

6. The hose reel apparatus of claim 1, wherein the adjacent clamp arms are pivotally mounted on the indexer to form a scissor clamp.

7. The hose reel apparatus of claim 6, wherein the adjacent clamp arms are shaped complimentary to the cross section of the hose.

\* \* \* \* \*